United States Patent [19]
Plumadore
[11] 4,041,312
[45] Aug. 9, 1977

[54] APPARATUS FOR ELECTROSTATICALLY CHARGING AN ELECTROPHOTOGRAPHIC FILM

[75] Inventor: John D. Plumadore, Westfield, Mass.
[73] Assignee: A. B. Dick/Scott, S. Hadley, Mass.

[21] Appl. No.: 570,822
[22] Filed: Apr. 23, 1975
[51] Int. Cl.[2] .................... G01M 21/34
[52] U.S. Cl. .................... 250/315 R; 250/326
[58] Field of Search .......... 250/324, 326, 315, 315 A

[56] References Cited

U.S. PATENT DOCUMENTS

| | | | |
|---|---|---|---|
| 3,335,275 | 8/1967 | King | 250/326 |
| 3,464,818 | 9/1969 | Waly | 250/315 |
| 3,729,649 | 4/1973 | Chappelle et al. | 250/326 |
| 3,780,288 | 12/1973 | Dryden | 250/315 A |

*Primary Examiner*—Alfred E. Smith
*Assistant Examiner*—B. C. Anderson
*Attorney, Agent, or Firm*—R. Duke Vickrey

[57] ABSTRACT

Disclosed is an improved apparatus for electrostatically charging an electrophotographic film held stationary with respect to a corona source. The improvement consists of a capacitor interconnecting the film to ground for limiting the amount of charge deposited upon the film during charging.

6 Claims, 1 Drawing Figure

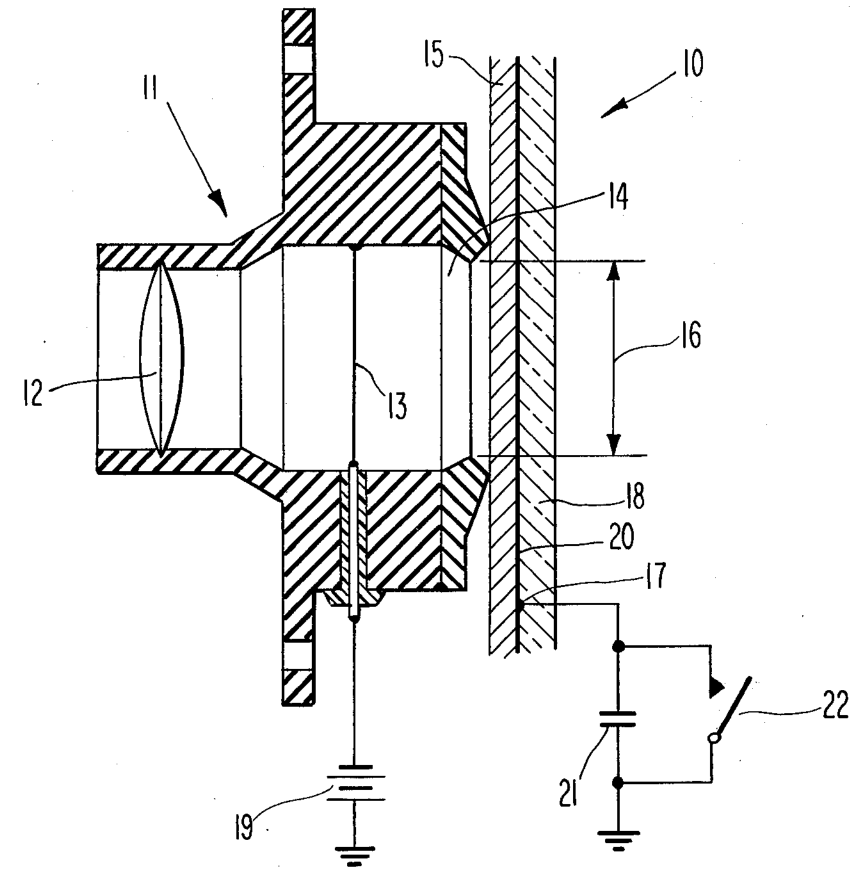
11
10
15
14
16
12
13
18
20
17
22
21
19

APPARATUS FOR ELECTROSTATICALLY CHARGING AN ELECTROPHOTOGRAPHIC FILM

BACKGROUND OF THE INVENTION

1. Field of the Invention

This invention relates generally to electrophotography and more particularly to improvements in electrostatically charging electrophotographic film with an apparatus which limits the amount of charge deposited upon the film during charging.

2. Description of the Prior Art

In electrophotography, it is common to apply uniform electrostatic charge to the surface of an electrophotographic film, which generally consists of a photoconductive layer overlying a conductive layer. The charge is then selectively dissipated in a pattern by exposing the photoconductive surface to a light image. The resulting pattern of charges produces an electrostatic latent image upon the photoconductive layer which is rendered visible by applying thereto electrostatically charged developer particles which adhere to the surface of the photoconductive layer by electrostatic forces. A permanent visible image can be obtained, for example, by using developer particles which can be heat fused to the photoconductive layer and subjecting it to a heat application step.

Charging is conventionally accomplished by exposing the surface of the photoconductive layer to a corona discharge, the polarity of which is chosen to produce the desired results upon a particular photoconductive layer being charged. Superior image reproductions are obtainable only when very uniform electrostatic charges are established on the photoconductive layer before imaging. High voltages for generating corona are particularly desirable to maintain uniformity, but can subject the photoconductive layer of the film to excessive charge buildup which can damage the photoconductive layer by current leakage into the conductive layer beneath. A number of techniques have been employed to limit the amount of charge buildup on the photoconductive layer, the most common of which is the use of electrical circuitry to limit corona production (an example being disclosed in U.S. Pat. No. 3,335,275 to King). Unfortunately, a good stable corona produced by high voltage is necessary to assure charge uniformity on the photoconductive layer. Furthermore, the common technique for limiting corona production results in an undersirable level of current leakage through the photoconductive layer.

In view of the disadvantages of the prior art, it is an object of the invention to provide means for limiting the amount of charge deposited upon the photoconductive layer of an electrophotographic film without adversely affecting corona production or excessively damaging the photoconductive layer by charge leakage therethrough.

SUMMARY OF THE INVENTION

The object of the invention is accomplished in an apparatus for electrostatically charging an electrophotographic film with a corona source by the improvement of a capacitor interconnecting the film to ground, whereby the amount of charge deposited upon the film is limited. The invention is applicable to apparatus wherein the film is held stationary with respect to the corona source during charging. The value of the capacitor interconnecting the film to ground is preferable smaller than the capacitor value of the photoconductive area being charged. When the voltage on this external capacitor, coupled with the capacitor formed by the photoconductive layer with its underlying conductive layer, is high enough to prevent further charge deposition to the photoconductive layer, the charging process is completed. Since most photoconductive materials used for electrophotography leak somewhat during charging, the use of the external capacitor minimizes this leakage and the resulting electrical breakdown in the photoconductive layer. After charging and imaging of a predetermined portion of the electrophotographic member, the external capacitor is discharged through short circuiting means, such as a conventional switch, to facilitate developing the image.

BRIEF DESCRIPTION OF THE DRAWING

The drawing is a cross-sectional view schematically illustrating corona generation means and imaging means in operative position against an electrophotographic film.

DESCRIPTION OF THE PREFERRED EMBODIMENT OF THE INVENTION

While the present invention has benefical application with a variety of electrophotographic elements in a variety of apparatus, it will be described herein in its preferred use of charging a predetermined portion or frame of a microfiche, which is imaged in the same location in which it is charged. The microfiche can be one upon which a number of documents are recorded in separate, distinct frames of a small size, such as 11-$\frac{3}{4}$ by 16-$\frac{1}{2}$ millimeters.

Referring to the drawing, part of a conventional electrophotographic film or microfiche 10 is illustrated and consists of support 18 covered with a very thin conductive layer 20, which in turn is coated with a photoconductive layer 15. The support 18 is preferably electrically insulating and may comprise any of the well-known materials used for such purposes. Any conventional conductive material may be employed to render conductive layer 20 electrically conductive, such as a plated metallic or other conductive layer coated onto support 18. Similarly, any conventional photoconductive material may be used to form photoconductive layer 15.

The microfiche 10 is positioned against a charging and imaging module 11 to place a frame 16 (representing only one of the two dimensions) on the optical axis of the imaging system. Within module 11 are lens 12 and corona discharge electrode 13. Opposite the lens 12, the lens module 11 has a rectangular opening 14 against which the photoconductive layer 15 is placed for charging and imaging. The opening 14 is framed by a mask which prevents charging beyond the frame 16 placed against the opening 14.

One lead from a conventional high voltage power source 19 is connected to conventional corona electrode 13 and the other lead is grounded. The voltage typically provided by power source 19 is in the range of from about 6-$\frac{1}{2}$ to about 9 kilovolts DC with the negative lead connected to corona electrode 13. It should be recognized, however, that almost any form of conventional power source for generating corona could be used.

Microfiche 10 is provided with connection means 17 to electrically connect conductive layer 20 into a desired circuit. The connection may be accomplished by any of a number of well-known techniques, such as removing a portion of the photoconductive layer 15 or the insulating support 18 to permit connection with the conductive layer 20.

An electrical connection is made through connection means 17 through a capacitor 21 to ground. The capacitor 21 will be charged in response to charging of the frame during the charging step. The value of the capacitor 21 is preferably chosen to be less than the capacitative value of the portion of the electrophotographic film being charged, i.e., the capacitance formed by the electrophotographic layer 15 with the conductive layer 20. Larger capacitors will produce some benefical results, although not to the same extent. It is necessary that the area being charged by uniformly charged at the same time, which precludes the use of a scanning type charging system, such as used for most office copy systems.

The electrical circuit means interconnecting connection means 17 to ground preferably includes short circuiting means, which can be provided by conventional switch 22, to discharge capacitor 21 after imaging in order to facilitate development of the latent electrostatic image formed on the film.

In a preferred form of the invention, the capacitor 21 is chosen to have approximately one-fourth the capacitance of the film area being charged, thereby producing a high apparent surface voltage on the photoconductive layer without excessive current leakage through the photoconductive layer 15. With this preferred size capacitor, the rate of charge diminishes rapidly and smoothly as the charge builds up. The use of small capacitor values produces a high apparent surface voltage without excessive current leakage through the photoconductor. The smaller the capacitor the faster the final apparent surface voltage is reached with less current drawn to the photoconductor, minimizing the possibility of photoconductor breakdown. And in the event of a photoconductor breakdown, the current drawn through the photoconductive layer further charges the capacitor so that actual charging stops even more quickly, minimizing the effects of a breakdown.

The capacitor 21 has been illustrated within a circuit external to the microfiche 10 but it should be recognized that it could be part of the film such as formed by a conductive layer on the surface of the substrate 18 opposite the conductive layer 20. It should also be recognized that the invention is applicable to electrophotographic elements in general and the term "film" used in the specification and claims is used in this broad sense.

I claim:

1. In an apparatus for electrostatically charging an electrophotographic film comprising a photoconductive layer and a conductive layer with a corona source, wherein the film is held stationary with respect to the corona source during charging, the improvement comprising:

a capacitor interconnecting the conductive layer of the film with ground, the capacitor having a value smaller than the capacitor value of the portion of the film being charged, whereby the amount of charge deposited upon the film during corona charging is limited.

2. Apparatus described in claim 1, wherein the capacitor has a value of less than ¼ the capacitor value of the portion of the film being charged.

3. Apparatus described in claim 1, further including means to short circuit the capacitor to discharge the capacitor before developing the image.

4. In an apparatus for electrostatically charging with a corona source the photoconductive layer of an electrophotographic film comprising a photoconductive layer and a conductive layer, wherein the film is held stationary with respect to the corona source during charging, the improvement for limiting the amount of charge deposited upon the film during corona charging, consisting essentially of a capacitor interconnecting the conductive layer of the film with ground, whereby a high apparent surface voltage on the photoconductive layer can be produced without excessive current leakage through the photoconductive layer.

5. Apparatus described in claim 4, wherein the capacitor has a value smaller than the capacitor value of the portion of the film being charged.

6. Apparatus described in claim 5, wherein the capacitor has a value of less than ¼ the capacitor value of the portion of the film being charged.

* * * * *